United States Patent [19]

Sakoe

[11] 4,256,924

[45] Mar. 17, 1981

[54] DEVICE FOR RECOGNIZING AN INPUT PATTERN WITH APPROXIMATE PATTERNS USED FOR REFERENCE PATTERNS ON MAPPING

[75] Inventor: Hiroaki Sakoe, Tokyo, Japan

[73] Assignee: Nippon Electric Co., Ltd., Tokyo, Japan

[21] Appl. No.: 95,263

[22] Filed: Nov. 19, 1979

[30] Foreign Application Priority Data

Nov. 22, 1978 [JP] Japan ................................. 53-144428

[51] Int. Cl.³ .............................................. G10L 1/00
[52] U.S. Cl. .................................. 179/1 SD; 364/513
[58] Field of Search ................ 179/1 SD, 1 SB, 1 SC; 340/146.3 WD, 146.3 FT, 148, 146.3 AQ, 146.3 H, 146.3 SY; 364/513

[56] References Cited

U.S. PATENT DOCUMENTS

| | | | |
|---|---|---|---|
| 3,816,722 | 6/1974 | Sakoe | 179/1 SA |
| 3,818,443 | 6/1974 | Radcliffe | 340/146.3 SY |
| 4,027,284 | 5/1977 | Hoshino et al. | 340/146.3 AQ |
| 4,092,493 | 5/1978 | Rabiner et al. | 179/1 SD |
| 4,173,015 | 10/1979 | Owens et al. | 340/146.3 H |

OTHER PUBLICATIONS

H. Sakoe et al., "Dynamic Programming Algorithm etc.," IEEE Trans. Acoustics etc., Feb. 1978, pp. 43–49.
L. Pols, "Real Time Recognition of Spoken Words," IEEE Trans. on Computers, Sep. 1971, pp. 972–978.

*Primary Examiner*—Felix D. Gruber
*Assistant Examiner*—E. S. Kemeny
*Attorney, Agent, or Firm*—Sughrue, Rothwell, Mion, Zinn and Macpeak

[57] ABSTRACT

In a speech recognition system which time-normalizes (i.e. aligns by time-warping) each pre-stored reference pattern of feature vectors $b_j$ before comparison with the input signal pattern vectors $a_i$, an improved time-alignment technique requiring less calculation, by selecting "standard" vectors $v_{m(j)}$ which approximate the reference vectors thereby simplifying the derivation of the time-warp mapping function $j=j(i)$.

2 Claims, 9 Drawing Figures

DEVICE FOR RECOGNIZING AN INPUT PATTERN WITH APPROXIMATE PATTERNS USED FOR REFERENCE PATTERNS ON MAPPING

BACKGROUND OF THE INVENTION

This invention relates to a device for recognizing an input pattern by the use of a predetermined number of reference patterns. Although equally well applicable to recognition of various patterns, such as type-printed or hand-printed letters, a device according to this invention will be described in the following mainly in connection with a speech recognition device.

A device for recognizing continuous speech sound of one or more spoken words and for encoding the result of recognition is advantageous as a device for supplying data and/or program words to an electronic digital computer and a device for supplying control data to various apparatus. The reasons are as follows.

First, the input operation may be carried out by an untrained person because it is only necessary to pronounce the input data rather than manipulating a keyboard or a like facility. Secondly, the input operation is possible with hands and feet used in accomplishing other purposes. In the third place, the input data may be supplied to the computer or the like even from a remote location merely through an ordinary telephone network.

Because of these merits, the speech recognition devices are widely demanded and have been developed at various places in the world into practical use.

In a speech recognition device, it is preferred in general to carry out pattern matching with the technique of dynamic programming resorted to as described in, for example, U.S. Pat. No. 3,816,722 issued to Hiroaki Sakoe and Seibi Chiba, assignors to the present assignee. In a speech recognition divece of this type, speech sound is subjected to spectrum analysis, sampling, and digitization and is thereby transformed into a time sequence of vectors representative of features of the speech sound at the respective sampling instants (hereafter referred to as a time sequence of feature vectors). The speech sound is representative of one or more continuously spoken words of a preselected vocabulary. The time sequence is representative of a speech sound pattern of the continuously spoken word or words. Prior to recognition of each speech sound pattern supplied to the device (hereafter named an input pattern), which is unknown to the device, at least one standard speech sound pattern for each word of the vocabulary (hereafter called at least one reference pattern) is supplied to the device and memorized therein. Comparison, namely, pattern matching, is carried out between the input pattern and every reference pattern with the dynamic programming technique resorted to. One of the reference pattern that is most similar to the input pattern is selected. The word represented by the selected reference pattern gives the result of recognition.

It is to be noted here that the input pattern is subject to a complicated and nonlinear deformation as regards the time axis as a result of variations in the speed of utterance as pointed out in the above-cited patent and also in an article contributed by Hiroaki Sakoe and Seibi Chiba to IEEE Transactions on Acoustics, Speech, and Signal Processing, Vol. ASSP-26, No. 1 (February issue, 1978), pages 43–49, under the title of "Dynamic Programming Algorithm Optimization for Spoken Word Recognition." Optimum pattern matching is achieved only after nonlinearly compensating for fluctuations or shifts between the time axes of the input pattern and the respective reference patterns. As will be discussed more in detail in the following, a considerable amount of calculation is necessary even with application thereto of the dynamic programming technique. High-priced calculators are indispensable in accomplishing the calculation within a reasonable interval of time.

Accurate or reliable speech recognition devices are therefore expensive. Low-priced ones are objectionable as to the performance. Conventional speech or pattern recognition devices are thus still defective in respect of performance-to-price ratio.

SUMMARY OF THE INVENTION

It is therefore an object of the present invention to provide a pattern recognition device that is excellent in the ratio of performance to price.

It is a more specific object of this invention to provide a pattern recognition device of the type described, which is not expensive but retains the capability of carrying out pattern matching and time normalization.

According to this invention, there is provided a pattern recognition device for recognizing an input pattern by calculating similarity measures between the input pattern and a predetermined number N of reference patterns. The device comprises input pattern buffer means for memorizing a time sequence of input pattern feature vectors $\vec{a}_i (i=1, 2, \ldots, I)$ representative of the input pattern, reference pattern memory means for memorizing time sequences of reference pattern feature vectors $\vec{b}^n_j (n=1, 2, \ldots, N; j=1, 2, \ldots, J^n)$ representative of the respective reference patterns, standard vector memory means for memorizing standard vectors $\vec{v}_m (m=1, 2, \ldots, F)$ preselected in consideration of the reference pattern feature vectors $\vec{b}^n_j$, and dictionary memory means for memorizing a dictionary given by suffixes for identifying selected ones $\vec{v}_m n\ (j)$ of the standard vectors $\vec{v}_m$. The selected standard vectors $\vec{v}_m n\ (j)$ are those of the standard vectors $\vec{v}_m$ which are most similar to the reference pattern feature vectors $\vec{b}^n_j$ of the respective reference patterns. The device further comprises time normalizing means for finding a mapping function $j=j(i)$ for carrying out time normalization between the input pattern and each of the reference patterns by minimizing as a whole the difference between the input pattern feature vectors $\vec{a}_i$ and the standard vectors $\vec{v}_m(j)$ specified by the dictionary for the said each reference pattern and pattern matching means for carrying out pattern matching between the input pattern and the said each reference pattern based on the mapping function $j=j(i)$ to derive a similarity measure between the input pattern and the said each reference pattern.

By substituting approximate patterns composed of the selected standard vectors for the respective reference patterns according to this invention, it is possible to astonishingly reduce the amount of calculation necessary on finding the mapping or warping function.

DESCRIPTION OF THE PREFERRED EMBODIMENTS

Figure 1:
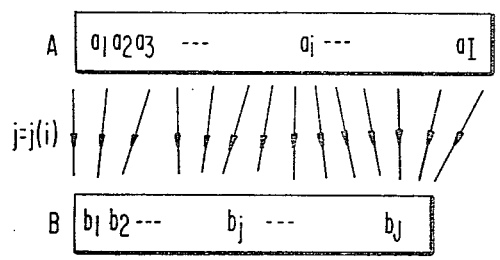
FIG. 1 diagrammatically shows an input pattern and a reference pattern for describing the principles of the time normalization technique known in the art and used also in a pattern recognition device according to the instant invention.
Figure 2:
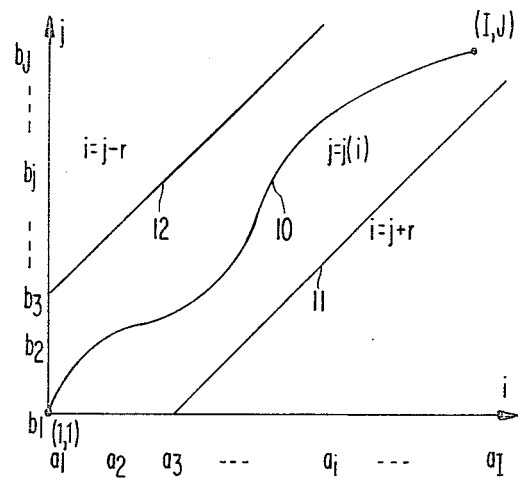
FIG. 2 is a graph showing an input pattern, a reference pattern, a mapping function, and a normalization window.

Referring to FIGS. 1 and 2, the technique of pattern matching described in the above-referenced patent and article will briefly be reviewed at first for a better understanding of the present invention. Merely for simplicity of description, an input pattern A to be recognized will be restricted in the description to that representative of a spoken word. For recognition of each of various input patterns A's, first through N-th reference patterns $B^n (n=1, 2, \ldots, N)$ are prepared for a predetermined number of reference words of a vocabulary. Each word of the vocabulary may be pronounced or uttered in more than one manner of pronunciation on preparing the reference patterns $B^n$. In any event, it is possible to differentiate the reference patterns $B^n$ from one another by the affix n. In other words, the respective reference patterns $B^n$ are identified by reference pattern-designating numbers n. When represented by the respective reference patterns $B^n$, the reference words are also identified by the reference pattern-designating numbers n.

An input pattern A is represented by a time sequence of first through I-th input pattern feature vectors $\vec{a}_i$ ($i=1, 2, \ldots, I$) arranged along a time axis i at euqally spaced i-th instants as:

$$A = \vec{a}_1, \vec{a}_2, \ldots, \vec{a}_I, \quad (1)$$

where the number I of the feature vectors $\vec{a}_i$ in the sequence, namely, the length of the sequence, will be called an input pattern length or duration. Like Equation (1), the respective reference patterns $B^n$ are given by time sequences consisting of first through $J^n$-th reference pattern feature vectors $\vec{b}^n_j$ ($j=1, 2, \ldots, J^n$), respectively, as:

$$B^n = \vec{b}^n_1, \vec{b}^n_2, \ldots, \vec{b}^n_{J_n}, \quad (2)$$

where $J^n$ (written as Jn in a simplified fashion in Equations (2)) will be named reference pattern durations. Time axes $j^n$ will be considered for the respective reference patterns $B^n$ because the speeds of pronunciation of the input and the reference words may differ from one another although the feature vectors $\vec{a}_i$ and $\vec{b}^n_j$ are spaced along the time axes i and $j^n$ usually at an equal interval that is decided by a common sampling interval. Each of the reference patterns $B^n$ will be represented by a time sequence of first through J-th reference pattern feature vectors $\vec{b}_j$ ($j=1, 2, \ldots, J$) as:

$$B = \vec{b}_1, \vec{b}_2, \ldots, \vec{b}_J.$$

The vectors $\vec{a}_i$, $\vec{b}^n_j$, and $\vec{b}_j$ and other vectors that will appear later are represented by the corresponding bold letters in the drawing and will be denoted by the usual letters in the following description unless the vector notations are desirable for some reason or other.

The feature vectors $a_i$ and $b_j$ are defined by first through Q-th vector components in a Q-dimensional space. The vector components are obtained by analysing each pattern A or B into a plurality of channels, Q in number, of different frequencies, such as logarithmically equally spaced frequencies, as:

$$a_i = (a_{i,1}, a_{i,2}, \ldots, a_{i,Q})$$

and $$b_j = (b_{j,1}, b_{j,2}, \ldots, b_{j,Q}),$$

where $a_{i,q}$ or $a_{iq}$ and $b_{j,q}$ or $b_{jq}$ ($q=1, 2, \ldots, Q$) represent q-th vector components. It is possible to deal with the vector components either serially or in parallel.

In order to quantitatively represent the likelihood or similarity between an input pattern A and a reference pattern B, a time-normalized distance $D(A, B)$ is defined as a similarity measure $S(A, B)$ therebetween by:

$$D(A, B) = \min_{j=j(i)} \sum_{i=1}^{I} d(i, j), \quad (3)$$

where $d(i, j)$ is defined, in turn, by:

$$d(i, j) = \| a_i - b_j \|,$$

and is called a vector distance between one each of the input and the reference pattern feature vectors $a_i$ and $b_j$. In connection with the vector distances $d(i, j)$, it may be mentioned here that the suffixes i and j are and will be used, as the case may be, to represent only one each of i and j defined hereinabove. This applies to other affixes used to differentiate similar quantitites from one another. In Equation (3), $j=j(i)$ is a mapping or warping function for mapping from the time axis i of the input pattern A to the time j of the reference pattern B. With the mapping function decided as exemplified in FIG. 2 at 10, namely, selected so as to make Equation (3) hold, it is possible to eliminate the nonlinear shift or fluctuation along the time axis i relative to the time axis j or compensate for the shift between the axes i and j on an i-j plane. In other words, the mapping function $j=j(i)$ is for determining the correspondence between the axes i and j. The time-normalized distance $D(A, B)$ is thereby rendered substantially equal to zero when the reference pattern B corresponds to the input pattern A. Otherwise, the time-normalized distances $D(A, B)$'s or $D(A, B^n)$ have finite values in whichever manner the mapping functions are selected.

The known technique of dynamic programming may be resorted to on solving the minimization problem given by Equation (3). More particularly, the minimum sought for is found by successively calculating recurrence coefficients g(i, j), as called herein, by the use of a recurrence formula:

$$g(i, j) = d(i, j) + \min g(i-1, j-p), \quad (4)$$

p = 0, 1, 2 in an ascending order for each of i and j. A direction coefficient p(i, j) of the mapping function j = j(i) for each value of j is varied from 0 to 2 for each value of i because it is usually sufficient on calculating the time-normalized distance D(A, B) to refer to only three previously calculated recurrence coefficients g(i−1, j), g(i−1, j−1), and g(i−1, j−2), which will be referred to as reference recurrence coefficients. The recurrence formula (4) is calculated, starting at an initial recurrence coefficient g(1,1) to eventually reach an ultimate recurrence coefficient g(I, J). The initial recurrence coefficient is given by an initial condiciton:

$$g(1, 1) = d(1, 1). \quad (5)$$

In practice, it is sufficient that the recurrence formula (4) be calculated only within a normalization or adjustment window known in the art to be given by:

$$j - r \leq i \leq j + r,$$

where r represents a constant called a width or length of the window. The window is depicted in FIG. 2 between two boundary lines 11 and 12, the boundaries inclusive.

Even with the normalization window, it is necessary on calculating the recurrence formula (4) to calculate the vector distances d(i, j) as often as (2r+1)J times. On the other hand, the width of the normalization window r and the reference pattern durations $j^n$ are about six and twenty, respectively, for the examples described in the article referred to hereinabove. The number of dimensions of the feature vectors $a_i$ or $b_j$ is usually about ten. It is thus necessary to calculate sums and differences about 2,600 times in order to minimize Equation (3) for each of N reference patterns $B^n$.

Figure 3:
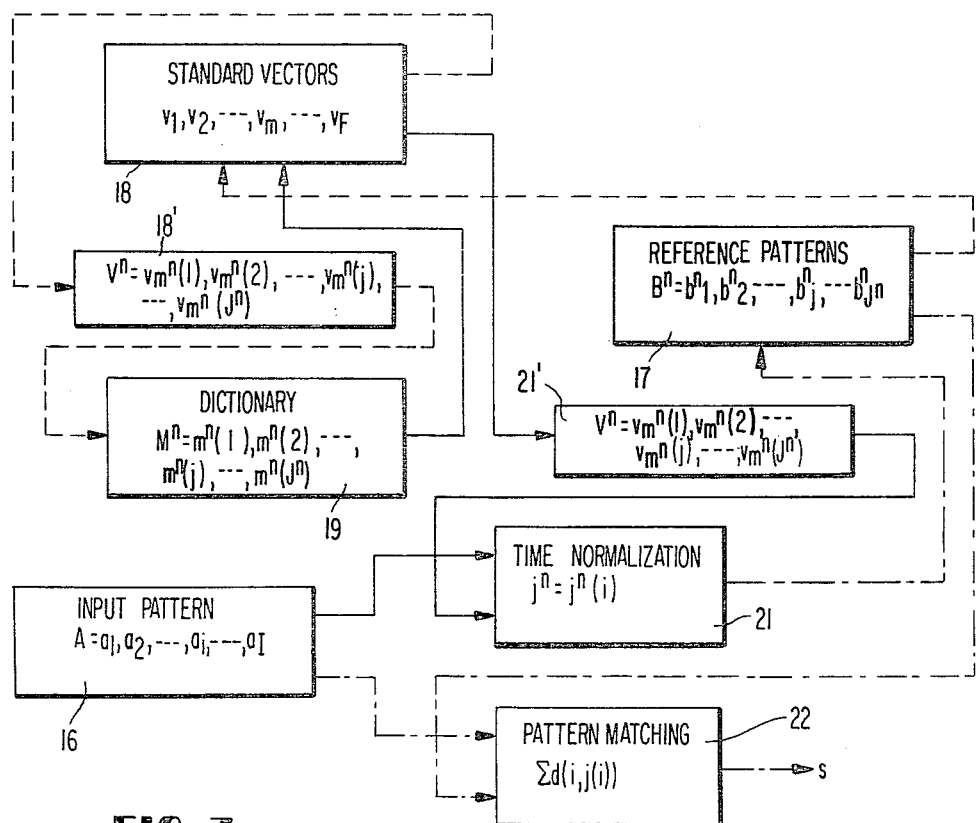
FIG. 3 is a block diagram of a pattern recognition device according to an embodiment of this invention.

Turning to FIG. 3, a pattern recognition device according to an embodiment of this invention is for recognizing an input pattern A by the use of a plurality of reference patterns $B^n$ n = 1, 2, ..., N) and comprises an input pattern buffer 16 for temporarily memorizing a time sequence of input pattern feature vectors $a_i$ given by Equation (1), a reference pattern memory 17 for memorizing time sequences of reference pattern feature vectors $b^n_j$ given by Equations (2), and a standard vector memory 18 for memorizing a plurality of standard vectors $v_m$ (m = 1, 2, ..., F) preselected in consideration of the reference pattern feature vectors $b^n_j$. The number F of the standard vectors $v_m$ may be considerably less than the total number of the reference pattern feature vectors $b^n_j$. The suffixes m to the standard vectors $v_m$ will be denoted also by k in the following as the case may be.

During a dictionary forming step designated in FIG. 3 by dashed lines and carried out as an off-line operation prior to supply of the input pattern A to the device, the reference pattern feature vectors $b_j$ of each reference pattern B are compared with the standard vectors $v_m$. Those approximate pattern feature vectors $v_{m(j)}$ are selected from the standard vectors $v_m$ as indicated at 18', which are most similar to the feature vectors $b_j$, respectively. A time sequence of first through J-th approximate pattern feature vectors $v_{m(j)}$ given by:

$$V = v_{m(1)}, v_{m(2)}, \ldots, v_{m(j)},$$

defines an approximate pattern V. With approximate patterns $V^n$ thus formed of approximate pattern feature vectors $v_{m^n(j)}$ (j = 1, 2, ..., $J^n$) for the respective reference patterns $B^n$, only the suffixes $m^n(j)$ of the approximate pattern feature vectors $v_{m^n(j)}$ of the respective approximate patterns $V^n$ are stored as a dictionary $M^n$ or M in a dictionary memory 19.

As soon as the input pattern A is supplied in FIG. 3 to the input pattern buffer 16, a time normalization step indicated by solid lines is carried out by a time normalization unit 21. At first, the approximate patterns $V^n$ are successively reproduced in effect with reference to the dictionary M as shown at 21'. The time normalization is carried out between the input pattern A and each reproduced approximate pattern V to find a mapping function j = j(i) defining the correspondence between the time axes i and j of the input pattern A and the reproduced approximate pattern V. Inasmuch as the approximate patterns $V^n$ are nearly identical with the respective reference patterns $B^n$, it is possible to consider that the mapping functions $j^n = j^n(i)$ are found for the respective reference patterns $B^n$.

Further referring to FIG. 3, next follows a pattern matching step specified by dash-dot lines. Responsive to the input pattern feature vectors $a_i$ and those reference pattern feature vectors $b_{j(i)}$ of each reference pattern B which are related to the input pattern feature vectors $a_i$ by the mapping function j = j(i) found for the approximate pattern V, a pattern matching unit 22 calculates the time-normalized distance D(A, B) by integrating the vector distances d(i, j)) with respect to i. The matching unit 22 thereby produces a similarity measure signal s representative of the time-normalized distance D(A, B).

Figure 4:
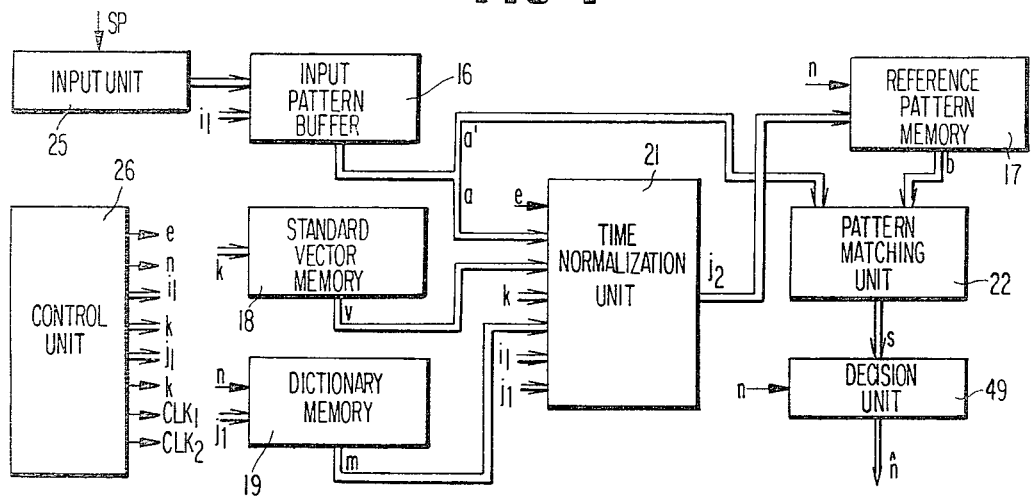
FIG. 4 is a block diagram of a pattern recognition device according to a practical embodiment of this invention.
Figure 5:
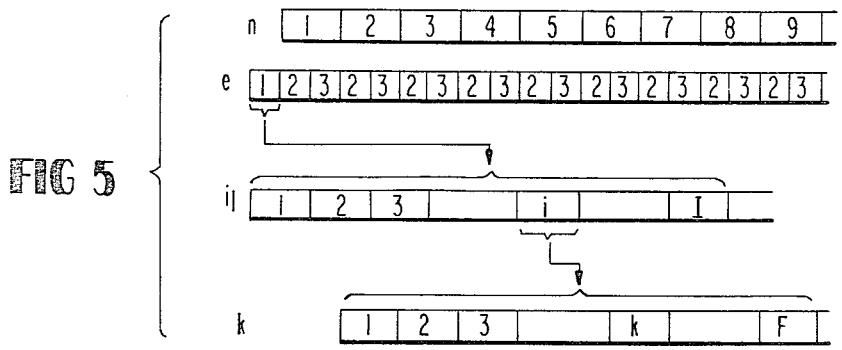
FIG. 5 is a time chart for describing operation of the device illustrated in FIG. 4 in a first part of a time normalization step.

Referring now to FIGS. 4 and 5, a pattern recognition device according to a practical embodiment of this invention comprises similar parts designated by like reference numerals and is operable by similar signals represented by like reference symbols. The device further comprises an input unit 25 for analysing a speech sound signal SP for an actually spoken word into the input pattern A. The input device 25 may be, for example, a spectrum analyser that is referred to by Louis C. W. Pols in an article he contributed to IEEE Transactions on Computers, Vol. C-20, No. 9 (September issue, 1971), pages 972–978, in FIG. 1, at band filters, log, detection, multiplexer and ADC. As soon as the input pattern A is stored in the input buffer 16 following the dictionary forming step mentioned hereinabove, a control unit 26 of the device produces for use in the time normalization and the pattern matching steps a mode signal e that is delivered to the time normalization unit 21 and indicates at first "1" to specify a distance calculation mode and then alternating "2" and "3" for specifying a time normalization and a function calculation mode, respectively, during the time that the control unit 26 produces also a reference pattern designating signal n for designating the reference patterns $B^n$ in a predetermined order. While the mode signal e specifies each of the modes, the control unit 26 produces an input pattern feature vector specifying signal $i_1$ variable in an ascending order from 1 to I to specify the input pattern feature vectors $a_i$. Responsive to the signal $i_1$, the input pattern buffer 16 supplies the normalization unit 21 with a first input pattern signal a sequentially representative of the feature vectors $a_i$.

When compared with the device illustrated with reference to FIG. 3 and as will become clear as the description proceeds, the device being illustrated carries out the time normalization step in the distance calculation mode and the respective time normalization modes. The approximate patterns $V^n$ are reproduced with reference to the dictionary memory 19 at the beginning of each time normalization mode. The matching step is carried out simultaneously with calculation of the mapping function $j=j(i)$ in each function calculation mode.

While the mode signal e specifies in FIGS. 4 and 5 the distance calculation mode and while furthermore the input pattern feature vector specifying signal $i_1$ specifies each of the input pattern feature vectors $a_i$, the control unit 26 produces a standard vector specifying signal k for specifying the suffixes 1 to F of the standard vectors $v_k$ in a preselected order. In response to the standard vector specifying signals k, the standard vector memory 18 supplies the normalization unit 21 with a standard vector signal v that successively represent the standard vectors $v_k$. Whenever the mode signal e is switched to the time normalization mode, the control unit 26 produces a suffix specifying signal $j_1$ that is variable in an ascending order preferably within the normalization window while the input pattern feature vector specifying signal $i_1$ specifies each of the input pattern feature vectors $a_i$. Responsive to the reference pattern designating signal n and the suffix specifying signal $j_1$, the dictionary memory 19 supplies the normalization unit 21 with a suffix signal m serially representative of this suffixes $m(j)$ of the approximate pattern feature vectors $v_{m(j)}$ of the approximate pattern corresponding to the reference pattern B being designated by the reference pattern designating signal n. The input pattern feature vector specifying signal $i_1$ and either the standard vector specifying signal k or the suffix specifying signal $j_1$ are supplied also to the normalization unit 21.

Figure 6:
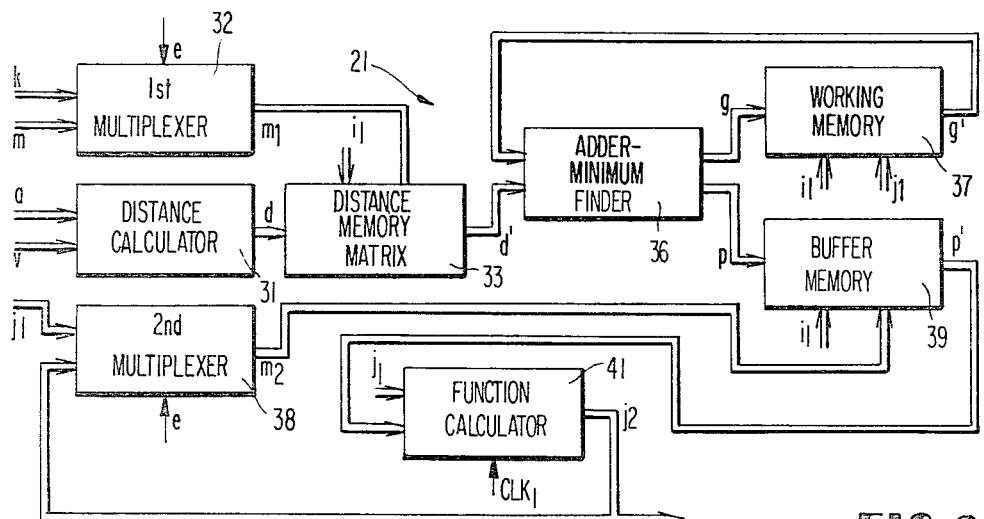
FIG. 6 is a block diagram of a time normalization unit for use in the device shown in FIG. 4.

Referring to FIG. 6 in addition to FIGS. 4 and 5, the time normalization unit 21 comprises a distance calculator 31 responsive to the input pattern and the standard vector signals a and v for calculating vector distances $d<i, k>$ between all combinations $(i, k)$ or $(i, m)$ of the input pattern feature and the standard vectors $a_i$ and $v_k$ or $v_m$ to produce an input distance signal d successively representative of the calculated vector distances $d<i, k>$. When the mode signal e indicates the distance calculation mode, a first multiplexer 32 selects the standard vector specifying signal k to produce the same as a first address signal $m_1$. The distance signal d is stored in a distance memory matrix 33 in addresses specified by the input pattern feature vector specifying signal $i_1$ and the address signal $m_1$.

Let it now be assumed in FIGS. 4 through 6 that the mode signal e specifies the time normalization mode, that the reference pattern designating signal n designates a reference pattern B, and that the input pattern feature vector specifying signal $i_1$ specifies the first input pattern feature vector $a_1$. At the beginning of the time normalization mode, the suffix specifying signal $j_1$ specifies the suffix $m(1)$ of the first approximate pattern feature vector $v_{m(1)}$ of the approximate pattern V corresponding to the designated reference pattern B. As described in general hereinabove, the suffix signal m produced by the dictionary memory represents the above-mentioned suffix $m(1)$ under the circumstances.

The multiplexer 32 selects the suffix signal m as the address signal $m_1$. Accessed by the input pattern feature vector specifying and the address signals $i_1$ and $m_1$, the distance memory matrix 33 produces an output distance signal d' that represents at first a vector distance $d<1, m(1)>$ between the first input pattern feature vector $a_1$ and the first approximate pattern feature vector $v_{m(1)}$ and is delivered to an adder-minimum finder 36 as the initial recurrence coefficient defined by Equation (5) and thence as an output recurrence coefficient signal g further to a working memory 37. Responsive to the input pattern feature vector and the suffix specifying signals $i_1$ and $j_1$, the recurrence coefficient signal g is stored in the working memory 37.

When the input pattern feature vector and the suffix specifying signals $i_1$ and $j_1$ specify a general combination $(i, j)$ for one each of the input and the approximate pattern feature vectors $a_i$ and $v_{m(j)}$, the working memory 37 supplies the adder-minimum finder 36 with an input recurrence coefficient signal g' successively representative of the reference recurrence coefficients $g(i=1, j-p)$. The adder-minimum finder 36 finds the minimum of the reference recurrence coefficients $g(i-1, j-p)$ and decides that direction coefficient $p(i, j)$ to produce an input direction coefficient signal p representative thereof, for which the minimum is found. A second multiplexer 38 selects the suffix signal $j_1$ as a second address signal $m_2$ while the mode signal e indacates the time normalization mode and produces no second address signal in the distance calculation mode. The direction coefficient signal p is stored in a buffer memory 39 in an address specified by the input pattern feature vector specifying and the second address signals $i_1$ and $m_2$. On the other hand, the suffix signal m supplied to the first multiplexer 32 now represents the suffix $m(j)$. The distance memory matrix 33 therefore makes the output distance signal d' represent a vector distance $d<i, m(j)>$. The adder-minimum finder 36 thus makes the output recurrence coefficient signal g represent the recurrence coefficient $g(i, j)$ given by the recurrence formula (4). When the input pattern feature vector and the suffix specifying signals $i_1$ and $j_1$ eventually specify the combination $(I, J)$, the mode signal e is switched to indicate the function calculation mode.

Figure 7:
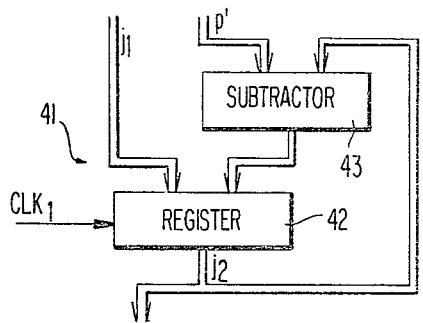
FIG. 7 is a block diagram of a function calculator for use in the unit depicted in FIG. 6.
Figure 8:
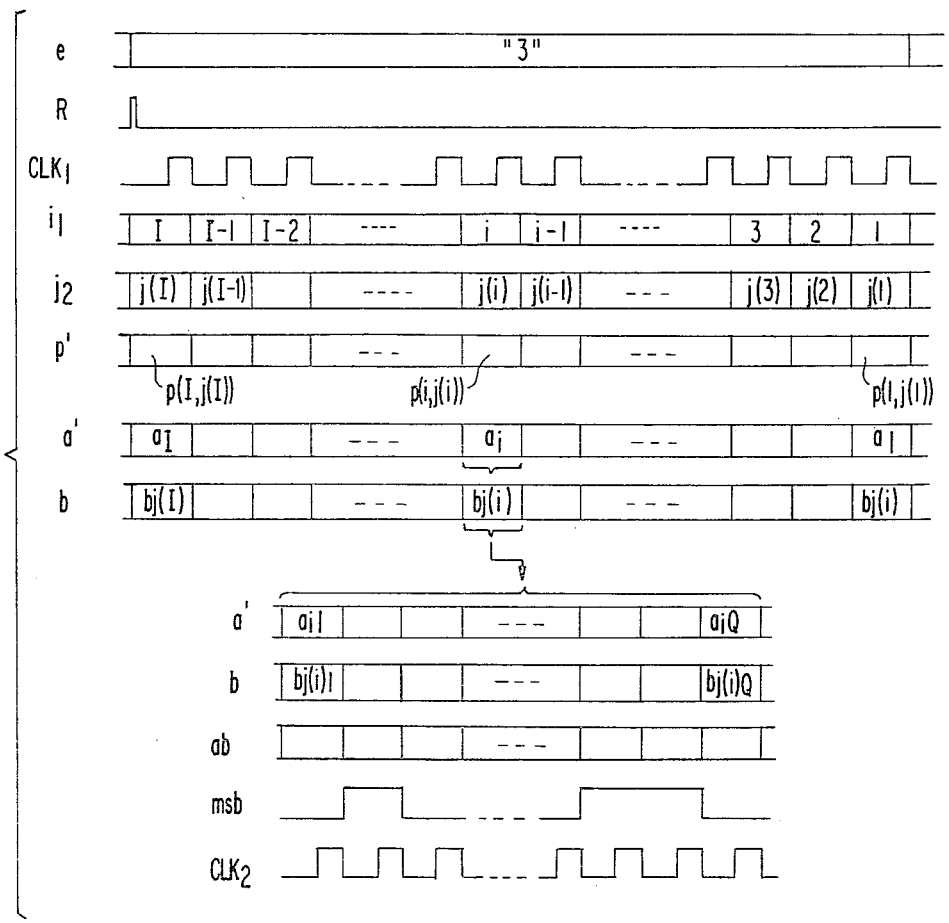
FIG. 8 is a time chart for describing operation of the device comprising the calculator illustrated in FIG. 7 in a latter part of the time normalization step and in a pattern maching step.

Referring now to FIGS. 7 and 8 in addition to FIGS. 4 and 6, the time normalization unit 21 comprises a function calculator 41 that comprises, in turn, a register 42. At the end of the time normalization mode, the suffix specifying signal $j_1$ that now specfies by J the suffix $m(J)$ of the J-th approximate pattern feature vector $v_{m(J)}$ of the approximate pattern V corresponding to the reference pattern B being designated by the reference pattern designating signal n is registered in the register 42. As soon as the mode signal e begins to indicate the function calculation mode, the first multiplexer 32 stops production of the first address signal $m_1$. Furthermore, the control unit 26 produces a reset pulse R that will be referred to later. During the function calculation mode, the unit 26 delivers a sequence of first clock pulses $clk_1$ to the register 42 and makes the input pattern feature vector specifying signal $i_1$ vary in a descending order, from I to 1, to specify the input pattern feature vectors $a_I, \ldots, a_2$, and $a_1$. The register 42 is for producing its content as a function signal $j_2$, which is selected by the second multiplexer 38 as the second address signal $m_2$.

When the input pattern feature vector specifying signal $i_1$ is representative of I, the register 42 makes the function signal $j_2$ represent J previously stored in the register 42. The value J of the signal $j_2$ represents the value of the mapping function $j=j(i)$ for $i=I$, namely, $j(I)$. Responsive to the input pattern feature vector specifying and the second address signals $i_1$ and $m_2$ representative of I and J, respectively, the buffer memory 39 produces an output direction coefficient signal p' representative of the direction coefficient $p(I, J)$. A subtractor 43 substracts the output direction coefficient signal p' from the function signal $j_2$. The difference is registered in the register 42 in response to build down of a first one of the first clock pulses $clk_1$. The function signal $j_2$ represents $j(I-1)$.

When the input pattern feature vector specifying signal $i_1$ represents a next value $I-1$, the output direction coefficient signal p' represents $p(I-1, j(I-1))$. The difference represents $j(I-1)-p(I-1, j(I-1))$, which difference is registered in the register 42 as the value $j(I-2)$ of the mapping function $j=j(i)$. The processess are repeated until the input pattern feature vector specifying signal $i_1$ eventually represents 1. The function calculator 41 thus successively calculates:

$$j(i) = j(i-1) - p(i-1, j(i-1)).$$

In the meantime, the input pattern buffer 16 supplies the pattern matching unit 22 with a second input pattern signal a' sequentially representative of the input pattern feature vectors $a_i$ from the I-th one to the first one $a_I$ to $a_1$. Responsive to the function signal $j_2$, the reference pattern memory 17 supplies the matching unit 22 with a reference pattern signal b successively representative of those reference pattern feature vectors $b_{j(i)}$ of the reference pattern B designated by the reference pattern designating signal n, from the J-th one $b_{j(I)}$ to the first one $b_{j(1)}$, which are optimally related to the I-th through the first input pattern feature vectors $a_I$ through $a_1$, respectively.

Figure 9:
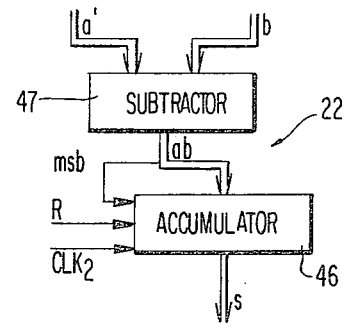
FIG. 9 is a block diagram of a pattern matching unit for use in the device depicted in FIG. 4.

Referring to FIG. 9 in addition to FIGS. 4, 6, and 8, the pattern matching unit 22 carries out the pattern matching step while the mode signal e indicates the function calculation mode. Responsive to the reset pulse R mentioned hereinabove, an accumulator 46 of the matching unit 22 is reset to zero. Supplied with the second input pattern and the reference pattern signals a' and b, a subtractor 47 of the matching unit 22 calculates the difference between the specified input pattern feature vector $a_i$ and the optimally related reference pattern feature vector $b_{j(i)}$ to produce a difference signal ab. The most significant bit msb of the difference signal ab is supplied as an add-subtract control signal to the accumulator 46. When the difference is positive, the most significant bit msb representative of "0" makes the accumulator 46 carry out addition of the difference to the content thereof. When the difference is negative, the most significant bit msb of "1" makes the accumulator 46 subtract the difference from the content thereof. In this manner, the accumulator 46 integrates the absolute values of the differences. When the input pattern feature vector specifying signal $i_1$ varies from I eventually to 1, the accumulator 46 is loaded with a signal representative of the time-normalized distance $D(A, B)$ given by Equation (3). The matching unit 22 produces a similarity measure signal s representative of the time-normalized distance $D(A, B)$. In practice, the subtractor 47 serially calculates the differences between the vector components $a_{iq}$ of each input pattern feature vector $a_i$ and the corresponding components $b_{j(i),q}$ of the reference pattern feature vector $b_{j(i)}$ related to that input pattern feature vector $a_i$ by the mapping function $j=j(i)$. The differences are integrated in the accumulator 46 in response to a sequence of second clock pulses $clk_2$ supplied thereto from the control unit 26.

Turning back to FIG. 4, the device comprises a decision unit 49 that may be a microprocessor described, for example, on page 7 of "The Am2900 Family Data Book" published 1976 by Advanced Micro Devices, Inc., California, U.S.A. The similarity measure signals s's or $s^n$ successively delivered to the decision unit 49 from the pattern matching unit 22 during the pattern matching steps for the respective reference patterns $B^n$ are compared with one another. From the values of the reference pattern designating signal n supplied from the control unit 26, the decision unit 49 selects an optimum reference pattern-identifying number $\hat{n}$ for which the similarity measure signals $s^n$ give the minimum time-normalized distance.

As pointed out hereinabove, it is necessary in prior art to calculate the vector distances $d(i, j)$ as often as $(2r+1)JN$ times on finding the mapping functions $j^n = j^n(i)$ of calculating the time-normalized distances $D(A, B^n)$ for N reference patterns. When the number N of the reference patterns $B^n$ is two hundred, $(2r+1)JN$ is as great as 52,000. In marked contrast, the vector distances $d<i, k>$ are calculated FI times by the distance calculator 31 described with reference to FIGS. 5 and 6 and IN times by the matching unit 22. The total is given by $(F+N)I$, which is equal to only 6,000 when $I \doteq J$ and $F = 100$.

While this invention has thus for been described in conjunction with a few preferred embodiments thereof, it is now possible for those skilled in the art to put this invention into effect in various other ways. For example, minimization of the distances between the input pattern feature vectors $a_i$ and the standard vectors $v_{m(j)}$ specified by the dictionary M for each reference pattern B on finding a mapping function $j=j(i)$ is equivalent to maximization of the similarity between the said input pattern feature and standard vectors $a_i$ and $v_{m(j)}$. The recurrence formula calculator comprising the adder-minimum finder 36 and the working and the buffer memories 37 and 39 may calculate according to the asymmetric dynamic programming algorithm given in the above-cited article, Table I, for $P=1$, a recurrence formula that is similar to Equation (4).

What is claimed is:

1. A pattern recognition device for recognizing an input pattern by calculating similarity measures between said input pattern and a predetermined number of reference patterns, said device comprising:

input pattern buffer means for memorizing a time sequence of input pattern feature vectors $\vec{a}_i (i=1, 2, \ldots, I)$ representative of said input pattern;

reference pattern memory means for memorizing time sequences of reference pattern feature vectors $\vec{b}^n_j (n=1, 2, \ldots, N; j=1, 2, \ldots, J^n)$ representative of the respective reference patterns;

standard vector memory means for memorizing standard vectors $\vec{v}_m (m=1, 2, \ldots, F)$ preselected in consideration of the reference pattern feature vectors $\vec{b}_j^n$;

dictionary memory means for memorizing a dictionary given by suffixes $m^n(j)$ for identifying selected ones $\vec{v}_m^n(j)$ of said standard vectors $\vec{v}_m$, said selected standard vectors $\vec{v}_m^n(j)$ being those of said standard vectors $\vec{v}_m$ which are most similar to the reference pattern feature vectors $\vec{b}_j^n$ of the respective reference patterns;

time normalizing means for finding a mapping function $j=j(i)$ for carrying out time normalization between said input pattern and each of said reference patterns by minimizing as a whole the difference between said input pattern feature vectors $\vec{a}_i$ and the standard vectors $\vec{v}_{m(j)}$ specified by said dictionary for each said reference pattern; and pattern matching means for carrying out pattern matching between said input pattern and said each reference pattern based on the mapping function $j=j(i)$ to derive a similarity measure between said input pattern and said each reference pattern.

2. A device as claimed in claim 1, further comprising decision means responsive to the similarity measures derived for the respective reference patterns for deciding one of said reference patterns as a result of recognition of said input pattern.

* * * * *

UNITED STATES PATENT AND TRADEMARK OFFICE
CERTIFICATE OF CORRECTION

PATENT NO. : 4,256,924
DATED : March 17, 1981
INVENTOR(S) : SAKOE

It is certified that error appears in the above—identified patent and that said Letters Patent is hereby corrected as shown below:

Column 1, line 57, delete "pattern" (first occurrence) and insert -- patterns -- .

Column 3,
    line 41, delete "n" and insert -- $\underline{n}$ -- ;
    line 43, delete "n" and insert -- $\underline{n}$ -- ;
    line 46, delete "n" and insert -- $\underline{n}$ -- ;
    line 49, delete "i" and insert -- $\underline{i}$ -- ;
    line 67, delete "fron" and insert -- from -- .

Column 4, line 1, delete "i" and insert -- $\underline{i}$ -- ;
    line 46, delete "i" and insert -- $\underline{i}$ -- ; delete "j" and insert -- $\underline{j}$ -- ;
    line 48, delete "i" and insert -- $\underline{i}$ -- ; delete "j" and insert -- $\underline{j}$ -- ;
    line 51, delete "i" and insert -- $\underline{i}$ -- ;
    line 52, after "time" insert -- axis -- ; delete "j" and insert -- $\underline{j}$ -- ;
    line 56, delete "i" and insert -- $\underline{i}$ -- ; delete "j" and insert -- $\underline{j}$ -- ;
    line 57, delete "i" and insert -- $\underline{i}$ -- ; delete "j" and insert -- $\underline{j}$ -- ;
    line 59, delete "i" and insert -- $\underline{i}$ -- ;
    line 60, delete "j" and insert -- $\underline{j}$ -- .

Column 5, line 8, delete "i" and insert -- $\underline{i}$ -- ; delete "j" and insert -- $\underline{j}$ -- ;
    line 10, delete "j" and insert -- $\underline{j}$ -- ; delete "i" and insert -- $\underline{i}$ -- ;
    line 13, delete "g(1-1, j)" and insert -- g(i-1, j) -- ;
    line 29, delete "r" and insert -- $\underline{r}$ -- ;

UNITED STATES PATENT AND TRADEMARK OFFICE
CERTIFICATE OF CORRECTION

PATENT NO. : 4,256,924
DATED : March 17, 1981
INVENTOR(S) : SAKOE

It is certified that error appears in the above—identified patent and that said Letters Patent is hereby corrected as shown below:

Column 5, line 36, delete "r" and insert -- $\underline{r}$ -- ; delete "j$^n$" and insert -- J$^n$ -- ;
    line 57, delete "m" and insert -- $\underline{m}$ -- ;
    line 58, delete "k" and insert -- $\underline{k}$ -- .

Column 6, line 4, delete the equation and insert the following:
-- $V = v_{m(1)}, v_{m(2)}, \ldots, v_{m(J)},$ -- ;

line 22, delete "i" and insert -- $\underline{i}$ -- ; delete "j" and insert -- $\underline{j}$ -- ;
    line 36, delete "d(i,j))" and insert -- d(i, j(i)) -- ; delete "i" and insert -- $\underline{i}$ -- ;
    line 37, delete "s" and insert -- $\underline{s}$ -- ;
    line 56, delete "e" and insert -- $\underline{e}$ -- ;
    line 61, delete "n" and insert -- $\underline{n}$ -- ;
    line 63, delete "e" and insert -- $\underline{e}$ -- .

Column 7, line 1, delete "a" and insert -- $\underline{a}$ -- ;
    line 14, delete "e" and insert -- $\underline{e}$ -- ;
    line 18, delete "k" and insert -- $\underline{k}$ -- ;
    line 21, delete "k" and insert -- $\underline{k}$ -- ;
    line 23, delete "v" and insert -- $\underline{v}$ -- ;
    line 24, delete "e" and insert -- $\underline{e}$ -- ;
    line 31, delete "n" and insert -- $\underline{n}$ -- ;
    line 33, delete "m" and insert -- $\underline{m}$ -- ; delete "this" and insert -- those -- ;
    line 37, delete "n" and insert -- $\underline{n}$ -- ;
    line 39, delete "k" and insert -- $\underline{k}$ -- ;
    line 44, delete "a" and insert -- $\underline{a}$ -- ; delete "v" and insert -- $\underline{v}$ -- ;
    line 47, delete "d" and insert -- $\underline{d}$ -- ;

UNITED STATES PATENT AND TRADEMARK OFFICE
CERTIFICATE OF CORRECTION

PATENT NO. : 4,256,924

DATED : March 17, 1981

INVENTOR(S) : SAKOE

Page 3 of 4

It is certified that error appears in the above—identified patent and that said Letters Patent is hereby corrected as shown below:

Column 7, line 49, delete "e" and insert -- $\underline{e}$ -- ;
line 51, delete "k" and insert -- $\underline{k}$ -- ;
line 52, delete "d" and insert -- $\underline{d}$ -- ;
line 57, delete "e" and insert -- $\underline{e}$ -- ;
line 58, delete "n" and insert -- $\underline{n}$ -- ;
line 66, delete "m" and insert -- $\underline{m}$ -- .

Column 8, line 1, delete "m" and insert -- $\underline{m}$ -- ;
line 5, delete "d' " and insert -- $\underline{d'}$ -- ;
line 10, delete "g" and insert -- $\underline{g}$ -- ;
line 13, delete "g" and insert -- $\underline{g}$ -- ;
line 20, delete "$g^3$" and insert -- $\underline{g}^1$ -- ;
line 22, delete "=" and insert -- - -- ;
line 25, delete "p" and insert -- $\underline{p}$ -- ;
line 28, delete "e" and insert -- $\underline{e}$ -- ;
line 31, delete "p" and insert -- $\underline{p}$ -- ;
line 34, delete "m" and insert -- $\underline{m}$ -- ;
line 37, delete "d' " and insert -- $\underline{d'}$ -- ;
line 39, delete "g" and insert -- $\underline{g}$ -- ;
line 44, delete "e" and insert -- $\underline{e}$ -- ;
line 53, delete "n" and insert -- $\underline{n}$ -- ;
line 54, delete "e" and insert -- $\underline{e}$ -- .

Column 9, line 7, delete "p' " and insert -- $\underline{p'}$ -- ;
line 9, delete "substracts" and insert -- subtracts --;
line 10, delete "p' " and insert -- $\underline{p'}$ -- ;
line 16, delete "p' " and insert -- $\underline{p'}$ -- ;
line 19, delete "processess" and insert -- processes -- ;
line 24, delete the equation and insert the following:
-- $j(i)=j(i-1)-p(i-1,j(i-1))$. --

UNITED STATES PATENT AND TRADEMARK OFFICE
CERTIFICATE OF CORRECTION

PATENT NO. : 4,256,924
DATED : March 17, 1981
INVENTOR(S) : SAKOE

It is certified that error appears in the above—identified patent and that said Letters Patent is hereby corrected as shown below:

Column 9, line 28, delete "b" and insert -- $\underline{b}$ -- ;
line 32, delete "n" and insert -- $\underline{n}$ -- ;
line 35, delete "n" and insert -- $\underline{n}$ -- ;
line 41, delete "e" and insert -- $\underline{e}$ -- ;
line 45, delete "a'" and insert -- $\underline{a}$' -- ;
line 46, delete "b" and insert -- $\underline{b}$ -- ;
line 49, delete "ab" and insert -- $\underline{ab}$ -- ;
line 50, delete "msb" and insert -- $\underline{msb}$ -- ; delete "ab" and insert -- $\underline{ab}$ -- ;
line 53, delete "msb" and insert -- $\underline{msb}$ -- ;
line 56, delete "msb" and insert -- $\underline{msb}$ -- ;
line 63, delete "s" and insert -- $\underline{s}$ -- .

Column 10, delete "s" (first occurrence) and insert -- $\underline{s}$ -- in line 10 ;
line 14, delete "n" and insert -- $\underline{n}$ -- ;
line 16, delete "$\hat{n}$" and insert -- $\underline{\hat{n}}$ -- ;
line 67, delete "$\vec{v}_m^{\,n}(j)$" and insert -- $\vec{v}_m^{\,n}(j)$ -- ;

line 69, delete "$\vec{v}_m^{\,n}(j)$" and insert -- $\vec{v}_m^{\,n}(j)$ -- .

Signed and Sealed this

Twenty-eighth Day of July 1981

[SEAL]

Attest:

GERALD J. MOSSINGHOFF

Attesting Officer     Commissioner of Patents and Trademarks